(12) United States Patent
Kim et al.

(10) Patent No.: US 10,551,845 B1
(45) Date of Patent: Feb. 4, 2020

(54) METHOD AND COMPUTING DEVICE FOR GENERATING IMAGE DATA SET TO BE USED FOR HAZARD DETECTION AND LEARNING METHOD AND LEARNING DEVICE USING THE SAME

(71) Applicant: Stradvision, Inc., Pohang, Gyeongbuk (KR)

(72) Inventors: Kye-Hyeon Kim, Seoul (KR); Yongjoong Kim, Gyeongsangbuk-do (KR); Insu Kim, Gyeongsangbuk-do (KR); Hak-Kyoung Kim, Gyeongsangbuk-do (KR); Woonhyun Nam, Pohang-si (KR); SukHoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Pohang-si (KR); Hongmo Je, Pohang-si (KR); Hojin Cho, Gyeongsangbuk-do (KR)

(73) Assignee: Stradvision, Inc., Pohang, Gyeongbuk (KR)

( * ) Notice: Subject to any disclaimer, the term of this patent is extended or adjusted under 35 U.S.C. 154(b) by 0 days.

(21) Appl. No.: 16/257,940

(22) Filed: Jan. 25, 2019

(51) Int. Cl.
*G05D 1/00* (2006.01)
*G05D 3/00* (2006.01)
(Continued)

(52) U.S. Cl.
CPC ......... *G05D 1/0221* (2013.01); *G05D 1/0246* (2013.01); *G06K 9/00805* (2013.01);
(Continued)

(58) Field of Classification Search
CPC .............. G05D 1/0221; G05D 1/0246; G05D 2201/0213; G06T 7/194; G06T 7/70;
(Continued)

(56) References Cited

U.S. PATENT DOCUMENTS

| | | | |
|---|---|---|---|
| 5,767,857 A * | 6/1998 | Neely | G06T 17/00 345/427 |
| 2005/0036047 A1* | 2/2005 | Kohashi | H04N 5/142 348/272 |

(Continued)

*Primary Examiner* — Harry Y Oh
(74) *Attorney, Agent, or Firm* — Kaplan Breyer Schwarz, LLP

(57) ABSTRACT

A method for generating at least one image data set for training to be used for a CNN capable of detecting objects in an input image is provided for improving hazard detection while driving. The method includes steps of: a computing device (a) acquiring a first label image in which edge parts are set on boundaries between the objects and a background and different label values are assigned corresponding to the objects and the background; (b) generating an edge image by extracting edge parts from the first label image; (c) generating a second label image by merging the first label image with a reinforced edge image, generated by assigning weights to the extracted edge parts; and (d) storing the input image and the second label image as the image data set. Further, the method allows a degree of detecting traffic sign, landmark, road marker and the like to be increased.

12 Claims, 3 Drawing Sheets

(51) Int. Cl.
  *G06F 7/00* (2006.01)
  *G06F 17/00* (2019.01)
  *G05D 1/02* (2006.01)
  *G06K 9/00* (2006.01)
  *G06K 9/62* (2006.01)
  *G06N 5/04* (2006.01)
  *G06N 20/00* (2019.01)
  *G06T 7/70* (2017.01)
  *G06T 7/194* (2017.01)
  *G06N 3/08* (2006.01)

(52) U.S. Cl.
  CPC ....... *G06K 9/00818* (2013.01); *G06K 9/6256* (2013.01); *G06N 3/08* (2013.01); *G06N 5/046* (2013.01); *G06N 20/00* (2019.01); *G06T 7/194* (2017.01); *G06T 7/70* (2017.01); *G05D 2201/0213* (2013.01); *G06T 2207/30261* (2013.01)

(58) Field of Classification Search
  CPC .......... G06T 2207/30261; G06N 20/00; G06N 3/08; G06N 5/046; G06K 9/00805; G06K 9/00818; G06K 9/6256
  See application file for complete search history.

(56) References Cited

U.S. PATENT DOCUMENTS

| | | | |
|---|---|---|---|
| 2005/0225648 A1* | 10/2005 | Lin | G06K 9/48 348/222.1 |
| 2011/0243470 A1* | 10/2011 | Noguchi | H04N 19/176 382/239 |
| 2014/0003723 A1* | 1/2014 | Lu | G06K 9/3258 382/182 |
| 2014/0169666 A1* | 6/2014 | Hong | G06T 15/503 382/162 |
| 2017/0116712 A1* | 4/2017 | Liao | G06K 9/4604 |
| 2018/0137642 A1* | 5/2018 | Malisiewicz | G06T 7/11 |
| 2019/0080164 A1* | 3/2019 | Duke | G06K 9/00456 |
| 2019/0120955 A1* | 4/2019 | Zhong | G01S 13/867 |

* cited by examiner

METHOD AND COMPUTING DEVICE FOR GENERATING IMAGE DATA SET TO BE USED FOR HAZARD DETECTION AND LEARNING METHOD AND LEARNING DEVICE USING THE SAME

FIELD OF THE DISCLOSURE

The present disclosure relates to a computing method and a computing device, a learning method and a learning device for use with an autonomous vehicle; and more particularly, to the computing method and the computing device for improving hazard detection while driving, and the learning method and the learning device using the same.

BACKGROUND OF THE DISCLOSURE

Deep learning is a technology used to cluster or classify objects or data. For example, computers cannot distinguish dogs and cats from photographs alone. But a human can easily distinguish those two. To this end, a method called "machine learning" was devised. It is a technique to allow a computer to classify similar things among lots of data inputted into the computer. When a photo of an animal similar to a dog is inputted, the computer will classify it as a dog photo.

There have already been many machine learning algorithms to classify data. For example, a decision tree, a Bayesian network, a support vector machine (SVM), an artificial neural network, etc. have been developed. The deep learning is a descendant of the artificial neural network.

Deep Convolution Neural Networks (Deep CNNs) are at the heart of the remarkable development in deep learning. CNNs have already been used in the 90's to solve the problems of character recognition, but their use has become as widespread as it is now thanks to recent research. These deep CNNs won the 2012 ImageNet image classification tournament, crushing other competitors. Then, the convolution neural network became a very useful tool in the field of the machine learning.

Image segmentation is a method of generating a label image by using an input image. As the deep learning has recently become popular, the segmentation is using the deep learning heavily. The segmentation had been tried with methods using only an encoder, such as a method for generating the label image by convolution operations. Thereafter, the segmentation has been performed with methods using an encoder-decoder configuration for extracting features of the image by the encoder and restoring them as the label image by the decoder. However, it is difficult to get a fine label image only with the encoder-decoder configuration. Therefore, various methods are provided to solve a problem that many of edge parts are missed in the process of encoding and decoding the image, and to reinforce the edge parts in the image or its corresponding feature map.

SUMMARY OF THE DISCLOSURE

It is an object of the present disclosure to solve all the aforementioned problems.

It is another object of the present disclosure to provide at least one image data set for training to be used for learning a CNN capable of detecting one or more edge parts by using at least one label image including one or more reinforced semantic edge parts.

It is another object of the present disclosure to provide a method for learning the CNN capable of detecting fine edge parts in a process of segmentation.

In accordance with one aspect of the present disclosure, there is provided a method for generating at least one image data set for training to be used for a CNN capable of detecting one or more objects in at least one input image, including steps of: (a) a computing device acquiring or supporting another device to acquire at least one first label image, corresponding to the input image, in which one or more edge parts are set on one or more boundaries between the objects and a background and each different label value is assigned to each class corresponding to each of the objects and the background; (b) the computing device generating or supporting another device to generate at least one edge image from the first label image by extracting the edge parts between each class of each of the objects and a class of the background; (c) the computing device generating or supporting another device to generate at least one reinforced edge image by assigning one or more weights to the extracted edge parts, and generating or supporting another device to generate at least one second label image by merging the reinforced edge image with the first label image; and (d) the computing device storing or supporting another device to store the input image and the second label image which functions as a GT (ground truth) image corresponding to the input image, as the image data set for training.

As one example, a label value assigned to the edge parts in the reinforced edge image is larger than each of label values assigned to each of the objects in the first label image.

As one example, at the step of (c), one or more enlarged edge parts are generated by increasing widths of the edge parts, and then the reinforced edge image is generated by assigning the weights to the enlarged edge parts.

As one example, at the step of (c), the reinforced edge image is generated such that the weights assigned to the enlarged edge parts therein have a uniform shape.

As one example, at the step of (c), the reinforced edge image is generated such that the weights assigned to the enlarged edge parts therein have a Gaussian shape.

In accordance with another aspect of the present disclosure, there is provided a learning method for a CNN capable of detecting one or more objects in at least one input image, including steps of: (a) a first computing device acquiring or supporting another device to acquire the input image as a training image, on condition that a second computing device has generated at least one image data set for training through processes of (i) acquiring at least one first label image, corresponding to the input image, in which one or more edge parts are set on one or more boundaries between the objects and a background and each different label value is assigned to each class corresponding to each of the objects and the background, (ii) generating at least one edge image from the first label image by extracting the edge parts between each class of each of the objects and a class of the background, (iii) generating at least one reinforced edge image by assigning one or more weights to the extracted edge parts, and generating at least one second label image by merging the reinforced edge image with the first label image, and (iv) storing the input image and the second label image which functions as a GT (ground truth) image corresponding to the input image, as the image data set for training; (b) the first computing device acquiring or supporting another device to acquire at least one segmentation result of the training image from the CNN; and (c) the first computing device learning or supporting another device to learn one or more parameters of the CNN by backpropagating at least one loss generated by referring to the segmentation result and the second label image.

In accordance with still another aspect of the present disclosure, there is provided a computing device for generating at least one image data set for training to be used for a CNN capable of detecting one or more objects in at least one input image, including: at least one memory that stores instructions; and at least one processor configured to execute the instructions to: perform processes of (I) acquiring or supporting another device to acquire at least one first label image, corresponding to the input image, in which one or more edge parts are set on one or more boundaries between the objects and a background and each different label value is assigned to each class corresponding to each of the objects and the background, (II) generating or supporting another device to generate at least one edge image from the first label image by extracting the edge parts between each class of each of the objects and a class of the background, (III) generating or supporting another device to generate at least one reinforced edge image by assigning one or more weights to the extracted edge parts, and generating or supporting another device to generate at least one second label image by merging the reinforced edge image with the first label image, and (IV) storing or supporting another device to store the input image and the second label image which functions as a GT (ground truth) image corresponding to the input image, as the image data set for training.

As one example, a label value assigned to the edge parts in the reinforced edge image is larger than each of label values assigned to each of the objects in the first label image.

As one example, at the process of (III), one or more enlarged edge parts are generated by increasing widths of the edge parts, and then the reinforced edge image is generated by assigning the weights to the enlarged edge parts.

As one example, at the process of (III), the reinforced edge image is generated such that the weights assigned to the enlarged edge parts therein have a uniform shape.

As one example, at the process of (III), the reinforced edge image is generated such that the weights assigned to the enlarged edge parts therein have a Gaussian shape.

In accordance with still yet another aspect of the present disclosure, there is provided a first computing device for a CNN capable of detecting at least one object in an input image, including: at least one memory that stores instructions; and at least one processor, on condition that a second computing device has generated at least one image data set for training through processes of (i) acquiring at least one first label image, corresponding to the input image, in which one or more edge parts are set on one or more boundaries between the objects and a background and each different label value is assigned to each class corresponding to each of the objects and the background, (ii) generating at least one edge image from the first label image by extracting the edge parts between each class of each of the objects and a class of the background, (iii) generating at least one reinforced edge image by assigning one or more weights to the extracted edge parts, and generating at least one second label image by merging the reinforced edge image with the first label image, and (iv) storing the input image and the second label image which functions as a GT (ground truth) image corresponding to the input image, as the image data set for training; configured to execute the instructions to: perform processes of (I) acquiring or supporting another device to acquire at least one segmentation result of the training image from the CNN, and (II) learning or supporting another device to learn one or more parameters of the CNN by backpropagating at least one loss generated by referring to the segmentation result and the second label image.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
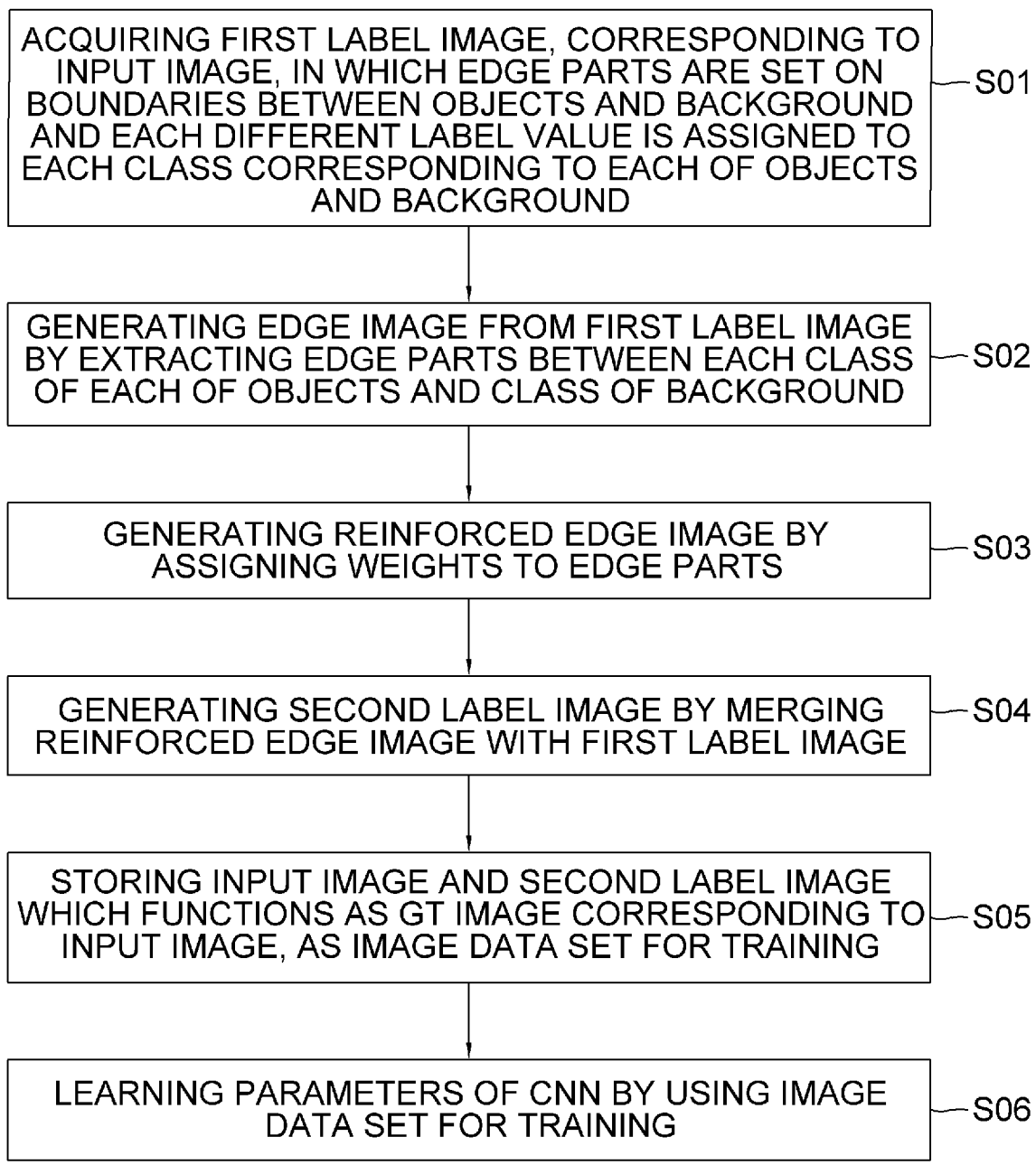
FIG. 1 is a flow chart schematically illustrating a process of generating at least one image data set for training in accordance with the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached drawings will be explained in detail as shown below.

Figure 2:
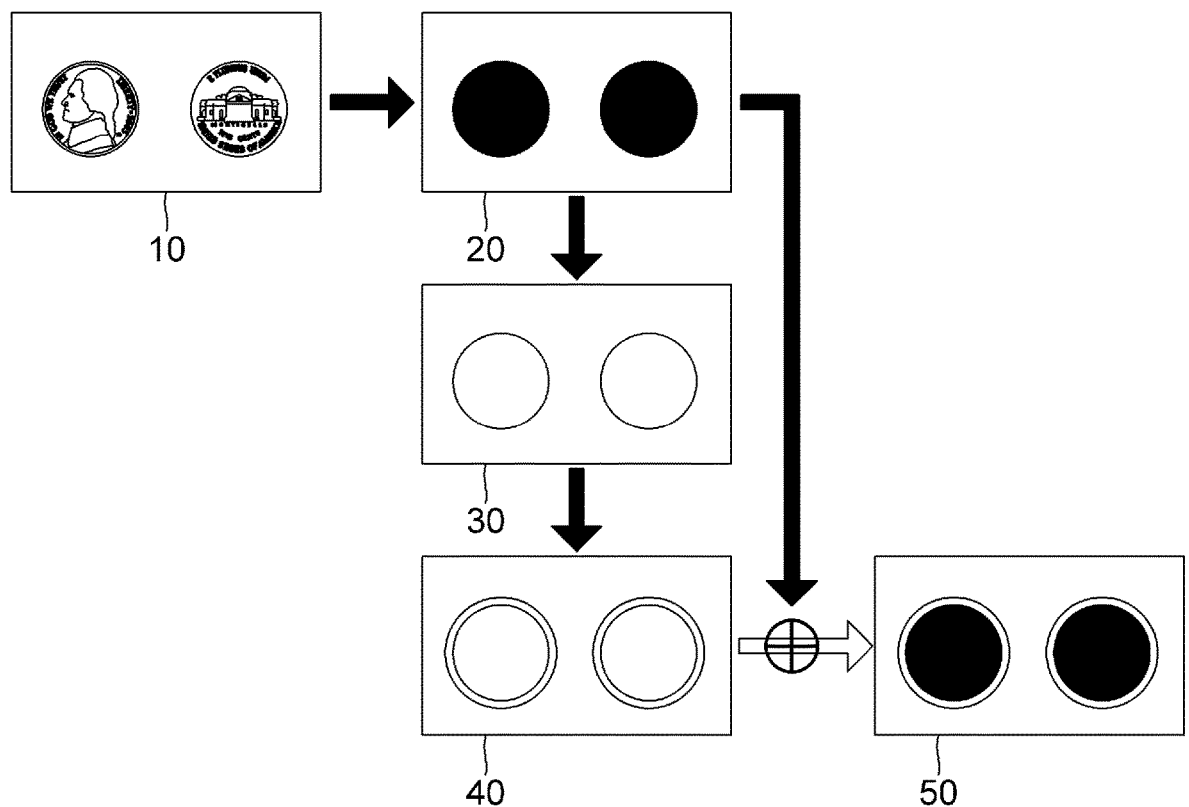
FIG. 2 is a drawing exemplary illustrating each image in a process of generating at least one new label image by merging at least one reinforced edge image with at least one initial label image in accordance with the present disclosure.

FIG. 1 is a flow chart schematically illustrating a process of generating at least one image data set for training in accordance with the present disclosure. FIG. 2 is a drawing exemplary illustrating each image in a process of generating at least one new label image by merging at least one reinforced edge image with at least one initial label image in accordance with the present disclosure.

By referring to FIGS. 1 and 2, processes of generating the image data set for training to be used for a CNN capable of detecting one or more objects in accordance with the present disclosure may be described as follows.

First of all, a computing device may acquire or may support another device to acquire the initial label image, i.e., at least one so-called first label image, corresponding to at least one input image, in which one or more edge parts are set on one or more boundaries between the objects and a background and each different label value is assigned to each class corresponding to each of the objects and the background at a step of S01. By referring to FIG. 2, a process of acquiring or supporting another device to acquire the first label image 20, corresponding to the input image 10, in which each different label value is assigned to each class corresponding to each of the objects and the background is illustrated. In this case, a label value of a class corresponding to the background may be assigned as 0, a label value of a class corresponding to two coins may be assigned as 1, in the first label image 20. As another example, the label value of the class corresponding to the background may be assigned as 0, a label value of a class corresponding to the left coin may be assigned as 1, and a label value of a class corresponding to the right coin may be assigned as 2.

Next, the computing device may generate or support another device to generate at least one edge image from the first label image 20 by extracting the edge parts between each class of each of the objects and the class of the background, at a step of S02. Further, the computing device may generate or support another device to generate the reinforced edge image 40 by assigning one or more weights to the edge parts, at a step of S03. As another example, the computing device may generate or support another device to generate one or more enlarged edge parts and then generate the reinforced edge image 40 by assigning the weights to the enlarged edge parts, at a step of S03. Herein, a label value assigned to the edge parts (or the enlarged edge parts) in the reinforced edge image 40 may be larger than each of label values assigned to each of the objects in the first label image 20. For example, if the label value of the class corresponding to the background is assigned as 0 and the label value of the class corresponding to the two coins is assigned as 1, in the first label image 20, the label value assigned to the edge parts may be 2. However, since an area of the class corresponding to the coins in the first label image 20 overlaps with an area of the class corresponding to the edge parts in the reinforced edge image 40, the label value of the edge parts may not need to be larger than the label value of the class corresponding to the coins. This is because the label value of the edge parts may become larger than the label value of the class corresponding to the coins, and this case will be explained later on.

Figure 3:
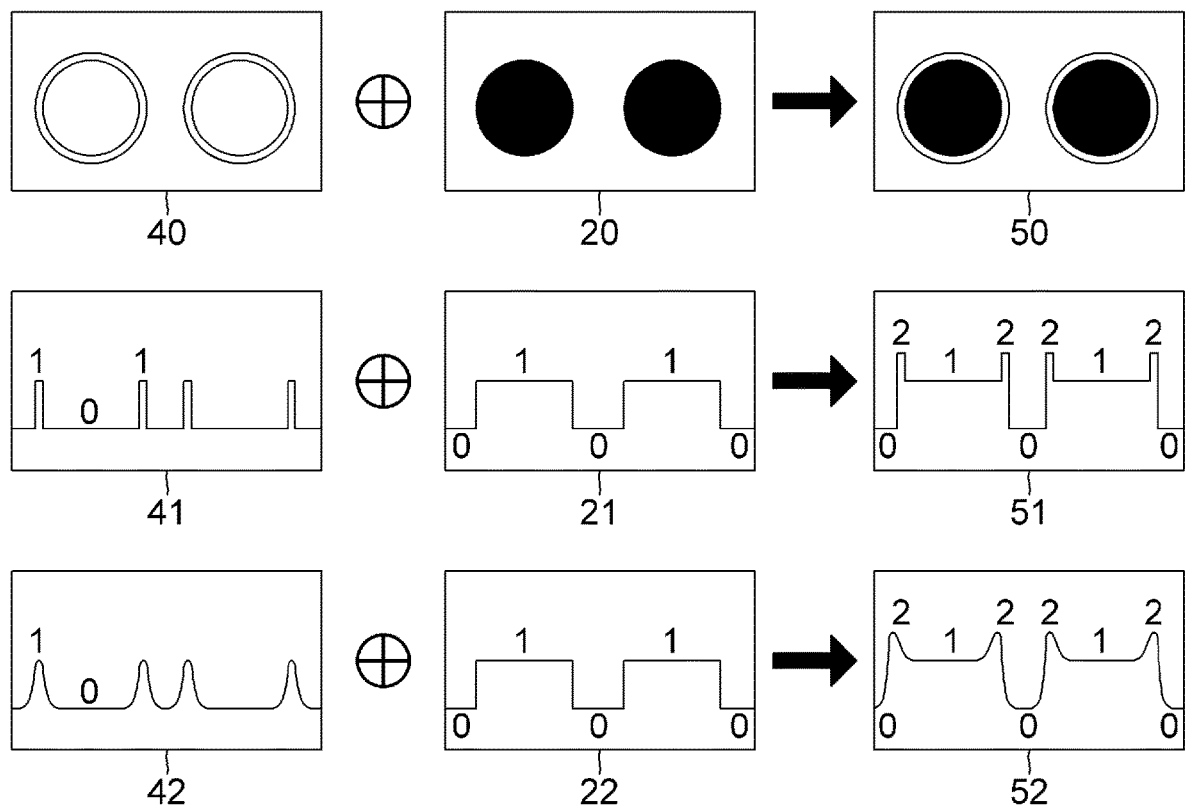
FIG. 3 is a drawing exemplary illustrating (i) the reinforced edge image, the initial label image, and the new label image generated by merging the reinforced edge image with the initial label image, and (ii) their corresponding distributions of label values.

FIG. 3 is a drawing exemplary illustrating (i) the reinforced edge image, the initial label image, and the new label image generated by merging the reinforced edge image with the initial label image, and (ii) their corresponding distributions of label values.

By referring to FIG. 3, the reinforced edge image 40 may be generated by reinforcing the edge parts of the edge image 30 by assigning one or more weights to the extracted edge parts. As another example, one or more enlarged edge parts are generated by increasing widths of the edge parts, and then the reinforced edge image 40 is generated by assigning the weights to the enlarged edge parts. Herein, the label value of the edge parts (or the enlarged edge parts) may be different from that of the other parts, i.e., the background. In an example of FIG. 3, the reinforced edge image 40 may be generated such that the label value 41 of the edge parts (or the enlarged edge parts) therein have a uniform shape in accordance with one example embodiment. Herein, in case of generating the reinforced edge image 40 by assigning the weights to the edge parts (or the enlarged edge parts), the reinforced edge image 40 may be generated such that the weights assigned to the edge parts (or the enlarged edge parts) therein have the uniform shape. Also, the reinforced edge image 40 may be generated such that the label value 42 of the edge parts (or the enlarged edge parts) therein have a Gaussian shape in accordance with another example embodiment. Herein, in case of generating the reinforced edge image 40 by assigning the weights to the edge parts (or the enlarged edge parts), the reinforced edge image 40 may be generated such that the weights assigned to the enlarged edge parts therein have the Gaussian shape.

Further, by referring to FIGS. 1 and 2 again, the computing device may generate or support another device to generate the new label image, i.e., a second label image 50 by merging the reinforced edge image 40 with the initial label image, i.e., the first label image 20, at a step of S04. A process of merging the reinforced edge image 40 with the first label image 20 may be performed by an element-wise sum of their label values, and may also be performed by the element-wise sum after applying element-wise product operation to the label value of the first label image 20 with the weights in the reinforced edge image 40.

By referring to FIG. 3, in case that the label value 41 of the edge parts (or the enlarged edge parts) in the reinforced edge image 40 has the uniform shape in accordance with one example embodiment, if the label value 41 is combined with the label value 21 of the first label image 20, a label value 51 of the second label image 50 may be generated. In case that the label value 42 of the edge parts (or the enlarged edge parts) in the reinforced edge image 40 has the Gaussian shape in accordance with another example embodiment, if the label value 42 is combined with the label value 22 of the first label image 20, a label value 52 of the second label image 50 may be generated. The enlarged edge parts may have larger widths in the second label image 50. Further, the edge parts (or the enlarged edge parts) may be set to have the weights or the label value thereof larger than the other classes in the example embodiments 51 and 52.

Additionally, the computing device may store or support another device to store (i) the input image 10 and (ii) the second label image 50 which functions as a GT (ground truth) image corresponding to the input image 10, as the image data set for training at a step of S05.

Further, one or more parameters of the CNN may be learned by using the image data set for training at a step of S06. Herein, the second label image 50 may function as the GT image to be compared with a segmentation result or an object detection result generated from the input image 10. For example, after the segmentation result is generated by inputting the input image 10 to the CNN, at least one loss may be generated by referring to the segmentation result and the second label image 50, and then the parameters of the CNN may be learned by backpropagating the loss.

If the parameters of the CNN are learned by using the image data set for training generated through the aforementioned processes, a training for the CNN capable of detecting the edge parts may be performed more efficiently since the edge parts in the second label image 50 are reinforced as the GT image. Especially, if the label value of the edge parts is larger than that of the other classes, the training may be processed more efficiently as the loss value of the edge parts is calculated to be larger than that of the other parts. Therefore, the edge parts may be recognized more accurately, and the segmentation result of finer edge parts may be generated.

The present disclosure has an effect of allowing the CNN to find the edge parts more efficiently by using at least one label image with reinforced edge parts.

The present disclosure has another effect of detecting fine edge parts in a process of testing a segmentation of an image, by using the reinforced edge image.

The above method may be used for improving hazard detection while driving, and may allow a degree of detecting traffic sign, landmark, road marker and the like to be increased.

It would be understood by one of ordinary skill in the art that a transmission and/or a reception of the above-described images can be performed by communication parts of the computing device and a learning device, and processes of the convolution operation, at least one deconvolution operation, and at least one loss value operation can be mainly performed by processors of the computing device and the learning device, but the present disclosure is not limited to these examples. In addition, the computing device and the learning device may further include memories capable of storing computer readable instructions for performing the above-described processes. As one example, the processor, the memory, a medium, etc. may be integrated with an integrated processor.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level language code that can be executed by a computer using an interpreter, etc. The hardware device can work as more than a software module to perform the process in accordance with the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for generating at least one image data set for training to be used for a Convolutional Neural Network (CNN) which detects one or more objects in at least one input image, comprising steps of:
   a computing device acquiring at least one first label image, corresponding to the input image, in which one or more edge parts are set on one or more boundaries between the objects and a background and each different label value is assigned to each class corresponding to each of the objects and the background;
   the computing device generating at least one edge image from the first label image by extracting the edge parts between each class of each of the objects and a class of the background;
   the computing device generating at least one reinforced edge image by assigning one or more weights to the extracted edge parts, and generating at least one second label image by merging the reinforced edge image with the first label image; and
   the computing device storing the input image and the second label image which functions as a GT (ground truth) image corresponding to the input image, as the image data set for training.

2. The method of claim 1, wherein a label value assigned to the edge parts in the reinforced edge image is larger than each of label values assigned to each of the objects in the first label image.

3. The method of claim 1, wherein one or more enlarged edge parts are generated by increasing widths of the edge parts, and wherein the reinforced edge image is generated by assigning the weights to the enlarged edge parts.

4. The method of claim 3, wherein the reinforced edge image is generated such that the weights assigned to the enlarged edge parts therein have a uniform shape.

5. The method of claim 3, wherein the reinforced edge image is generated such that the weights assigned to the enlarged edge parts therein have a Gaussian shape.

6. A learning method for a Convolutional Neural Network (CNN) which detects one or more objects in at least one input image, comprising steps of:
   a first computing device acquiring the input image as a training image, on condition that a second computing device has generated at least one image data set for training through processes of acquiring at least one first label image, corresponding to the input image, in which one or more edge parts are set on one or more boundaries between the objects and a background and each different label value is assigned to each class corresponding to each of the objects and the background, generating at least one edge image from the first label image by extracting the edge parts between each class of each of the objects and a class of the background, generating at least one reinforced edge image by assigning one or more weights to the extracted edge parts, and generating at least one second label image by merging the reinforced edge image with the first label image, and storing the input image and the second label image which functions as a GT (ground truth) image corresponding to the input image, as the image data set for training;

the first computing device acquiring at least one segmentation result of the training image from the CNN; and the first computing device learning one or more parameters of the CNN by backpropagating at least one loss generated by referring to the segmentation result and the second label image.

7. A computing device for generating at least one image data set for training to be used for a Convolutional Neural Network (CNN) which detects one or more objects in at least one input image, comprising:

at least one memory that stores instructions; and at least one processor configured to execute the instructions to: perform processes of acquiring at least one first label image, corresponding to the input image, in which one or more edge parts are set on one or more boundaries between the objects and a background and each different label value is assigned to each class corresponding to each of the objects and the background, generating at least one edge image from the first label image by extracting the edge parts between each class of each of the objects and a class of the background, generating at least one reinforced edge image by assigning one or more weights to the extracted edge parts, and generating at least one second label image by merging the reinforced edge image with the first label image, and storing the input image and the second label image which functions as a GT (ground truth) image corresponding to the input image, as the image data set for training.

8. The computing device of claim 7, wherein a label value assigned to the edge parts in the reinforced edge image is larger than each of label values assigned to each of the objects in the first label image.

9. The computing device of claim 7, wherein one or more enlarged edge parts are generated by increasing widths of the edge parts, and then wherein the reinforced edge image is generated by assigning the weights to the enlarged edge parts.

10. The computing device of claim 9, wherein the reinforced edge image is generated such that the weights assigned to the enlarged edge parts therein have a uniform shape.

11. The computing device of claim 9, wherein the reinforced edge image is generated such that the weights assigned to the enlarged edge parts therein have a Gaussian shape.

12. A first computing device for a Convolutional Neural Network (CNN) which detects at least one object in an input image, comprising:

at least one memory that stores instructions; and at least one processor, on condition that a second computing device has generated at least one image data set for training through processes of acquiring at least one first label image, corresponding to the input image, in which one or more edge parts are set on one or more boundaries between the objects and a background and each different label value is assigned to each class corresponding to each of the objects and the background, generating at least one edge image from the first label image by extracting the edge parts between each class of each of the objects and a class of the background, generating at least one reinforced edge image by assigning one or more weights to the extracted edge parts, and generating at least one second label image by merging the reinforced edge image with the first label image, and storing the input image and the second label image which functions as a GT (ground truth) image corresponding to the input image, as the image data set for training; configured to execute the instructions to: perform processes of acquiring at least one segmentation result of the input image acquired as a training image from the CNN, and learning one or more parameters of the CNN by backpropagating at least one loss generated by referring to the segmentation result and the second label image.

* * * * *